Patented Jan. 9, 1945

2,367,120

UNITED STATES PATENT OFFICE 2,367,120

PROCESS FOR IMPROVING THE PROPERTIES OF RUBBER LATEX

Johan Hubert Egbert Hessels, Klein Soengei-Karang, Galang, Sumatra, Netherland East Indies; vested in the Alien Property Custodian No Drawing. Application August 12, 1940, Serial No. 352,310. In the Netherlands August 29, 1939

6 Claims. (Cl. 260—817)

The invention is concerned with improving the properties of rubber latex.

It is based on decomposing the proteins present in the latex under special conditions. It is already known that rubber with a minimum protein content can be obtained by decomposing the proteins present in the latex through heating with alkali which, at the same time, keeps the latex from coagulating during the heating for which purpose quantities of 0.5 to 3% calculated on the weight of the latex was prescribed. After such treatment the latex is coagulated in the ordinary way.

But according to the new process, which aims at the preparation of an improved rubber latex or rubber cream, much smaller quantities of lye (alkali) are used than in the process described above, namely, by not dosing them for a complete decomposition of its proteins, but by using only just the quantity that is necessary to keep the latex liquid during subsequent heating. This heating may, it is true, take place at different temperatures, which in turn affect the duration of the heating, but in order to give a concrete example for practical application, heating for about an hour under pressure at a temperature of about 135° C. is presumed for present purposes. If the heating is obtained by aid of saturated steam, which is the simplest way, a steam pressure of 3 atmospheres is sufficient, so that no great demands are made as regards apparatus.

When heating under these conditions, it appears that an addition of only 0.10% of alkali, calculated as sodium hydroxide (NaOH) in relation to the weight of the latex, is sufficient to keep normal fresh latex, that is latex containing about 35 to 40% of solid substance, from coagulating. It will be understood, however, that this small quantity is not capable of decomposing the proteins completely, but it has now been found that it is still possible to obtain a sufficient decomposition of the proteins if, in addition to the lye, a small quantity of a stabilizer and/or an emulsifier is added to the latex, which is then heated.

Emulsifiers are understood to be substances that promote the formation of emulsions and the like; under stabilizers are included substances which protect the stability of such systems against mechanical, chemical, calorific and other influences. It is often impossible to make a sharp distinction between these two classes of substances for many substances are to be reckoned among both classes. As examples of such substances may be mentioned: soaps, fatty acids, sulfonated fatty acids and their derivatives, as described in the French Letters Patent No. 727,202.

The minimum quantity of alkali is somewhat dependent on the concentration of the latex, thus for a latex with a rubber content of 30%, even 0.06 to 0.08% of sodium-hydroxide is sufficient.

If it is desired to heat at a higher temperature, it should be taken into account that there is then greater danger of the latex's coagulating, so that more alkali will have to be used to prevent such coagulation. So, when heating to about 150° C., it will be necessary to use a quantity of 0.12 to 0.15% lye, calculated as NaOH with regard to the weight of the latex.

A latex, prepared as mentioned above, now shows the following improvements in its properties:

1. It creams more quickly.
2. In the process of creaming it yields a higher cream percentage than does a latex not so treated creaming under the same conditions.
3. It remains clear when stored in iron vessels, and
4. It requires much less ammonia for conservation.

These improvements will be dealt with separately hereunder.

With respect to 1 and 2: In creaming latex, often the difficulty is encountered that unless the latex has been specially treated beforehand, a cream of a sufficiently high percentage is not obtained.

In this regard, latex of young plantations and of diverse clones present special difficulty.

Improvement in creaming can be obtained by removing some of the proteins from the latex for example by previous coagulation, or by aid of absorbing agents, or by clarifying, or by speeding up the creaming by addition of soaps, or by dehydration of the dispersed rubber particles, or by other means.

Notwithstanding such preparatory treatment of the latex, the latex mixture should be allowed to stand for at least 2 or 3 days in order to obtain from a complete creaming a cream of sufficiently high rubber content of 60 to 63%. This long creaming time requires a fairly great quantity of conserving agents and a large tank capacity.

It appears that from treatment beforehand as prescribed by the invention, the latex obtains a surprisingly good creaming capacity so that, after mixing the latex with creaming agents in an ordinary creaming vessel, about 0.9 of the serum is separated in as short a time as 1 to 2 hours.

With respect to 3: One disadvantage of conserved latex is its tendency to become gray in colour when influenced by traces of iron salts due to the formation of iron sulphide.

When casking and storing latex in iron vessels and tanks, special precautions must always be taken to prevent the latex being spoiled by the iron, whereby an inferior product would be obtained.

Such discoloration can be prevented by providing the interior of tanks, pipes and drums with a protecting layer which has to be frequently renewed, which in practice involves much cost and labor.

Latex previously treated according to the invention and the cream obtained therefrom appear to be much less susceptible to iron discoloration than untreated latex. Without more ado the cream can be casked in iron vessels without discoloration occurring. Under these circumstances the previously treated latex itself has only a slight tendency to discolour in contrast with ordinary latex and cream-latex, both of which discolour very much in iron vessels.

With respect to 4: In consequence of the great susceptibility of latex to infection by micro-organisms, up to the present satisfactory conservation has only been obtained by adding comparatively large amounts of preservatives.

Although several substances have been suggested as preservatives for latex, in up to date practice ammonia has proved to be the most suitable and has consequently been most used.

A durable conservation of latex by ammonia not only makes it much more expensive, but under certain circumstances the rather high concentration of conserving agent proves to be undesirable for use of the latex in manufacture.

As a cheap preservative strong alkali would come under consideration if proper doses of this substance were not found to have unfavourable effects on the properties of rubber and therefore were only to be applicable in special cases.

Also during the concentration of latex by creaming, centrifuging, or dialyzing, a fairly large dose of preserving agent must be added to the latex to prevent vitiation during treatment. But a large proportion of the preservative is again lost in the serum (the under-latex), so that in such processes the costs of conservation become extra high.

A latex, previously treated according to the invention, and having a very low percentage of alkali, namely, a pH of about 9 or somewhat lower, keeps for an indefinite period if it is casked in sterilized drums.

Even if not sterile, such latex appears to be much less susceptible to infection than ordinary latex, so that for a stable preservation an addition of 0.20–0.25% ammonia is sufficient, while the usual quantity for ordinary latex amounts to about 0.7%.

The cream too, which is easily obtained from latex that has been treated according to the invention by the addition of a creaming agent and which, according to circumstances, contains 60 to 64% dry substance after a creaming period of 12 to 15 hours, requires only a small quantity of about 0.15% ammonia for protection against infection.

After the conservation, the cream may still be allowed to stand for a short time, e. g., for a week, whereby an after creaming takes place in the cream, whereafter after separation from the serum the cream contains up to 66 to 67% dry substance.

As already mentioned in the beginning, the treatment of latex with lye has often been described, but then the conditions prescribed were quite different.

In processes aiming at the complete decomposition of proteins by heating with lye, high lye concentrations are used, varying between 0.5 and 3% sodium-hydroxide calculated on the latex. But this high dose of alkali and the high ash content of the rubber obtained from such latex by evaporation have undesirable effects on products manufactured therefrom, such as a pronounced tendency to absorb water, an insufficient insulating capacity, and poor stability. Such latex is, therefore, generally not in demand by manufacturers of rubbergoods.

On the other hand, during dehydration of the latex, when it is heated with a small quantity of ammonia or lye, the exact temperature and time are not so chosen that there can be said to have been a decomposition of proteins, so that such previous treatment does not improve the properties of the latex, as is the case according to the present process.

The process is elucidated in more detail by the following examples:

*Example I.*—45 millimeters of 10-normal sodium-hydroxide were added to 15 liters of latex with a 36% total solids (T. S.) content, after which 30 grams of oleic acid were stirred into the latex. The latex was heated at 135° C. in an autoclave for 60 minutes.

The improvement of the latex was shown by diluting a part of the latex to 5%, and coagulating the rubber, which had a nitrogen content of 0.08% and an ash content of 0.10%, both calculated on the dry rubber.

One portion of this latex was lastingly preserved by addition of 0.25% ammonia, for after 4 months the alkalinity had not perceptibly decreased.

Another portion of this latex was lastingly preserved by using 0.2% pentachloric phenolsodium instead of ammonia.

After keeping the latex conserved with ammonia for 2 months in an unlacquered iron durm, the latex was only discoloured to a light gray equivalent to colour No. 2-3 on Davey's colourcard (India Rubber Journal, 1938, pg. 321). Under the same circumstances normal ammonia latex became dark gray equivalent to colour No. 7 on the same card.

*Example II.*—40 millimeters of 10-normal sodium-hydroxide and 30 grams of oleic acid were added to 15 liters of latex with 33% total solids (T. S.).

The latex was heated at 135° C. in an autoclave for 60 minutes.

After cooling down to about 80° C., 1.5 liter of a 1% Konnyaku flour-solution, a creaming agent, was added, whereupon the latex was allowed to cream in an insulated creaming vessel without any further addition of conserving agent.

After a creaming period of 15 hours, the creamlayer had a dry-substance content of 62.6%. The rubber, obtained by drying up the cream, contained 0.19% nitrogen and 0.75% ash, both calculated on the total solids (T. S.).

After 4 weeks, the water absorption of the dried rubber-film in an atmosphere of 90% relative humidity amounted to 3.7% as against 4.1% for a similar sample of centrifugated latex.

One part of that cream was lastingly preserved by the addition of 0.15% ammonia.

Another portion was lastingly preserved with 0.2% pentachloric phenolsodium, without adding any ammonia.

After keeping the cream for 2 months in an unlacquered iron drum, the colour of the latex appeared almost unchanged, while a creamed concentrate prepared in the normal way was greatly discoloured.

Having now particularly described and ascertained the nature of said invention and the manner in which it can be performed, I declare that what I claim is:

1. The process of deproteinizing rubber latex which comprises adding to the latex an alkali hydroxide in an amount not exceeding one tenth per cent of the dry rubber content, adding approximately two tenths per cent of a stabilizing fatty acid, and heating under pressure for one hour at approximately 135° C.

2. The process of deproteinizing rubber latex which comprises adding to the latex an alkali hydroxide in an amount not exceeding one tenth per cent of the dry rubber content, adding approximately two tenths per cent of a stabilizing fatty acid, heating under pressure for one hour at approximately 135° C., and adding a preservative.

3. The process of deproteinizing rubber latex which comprises adding to the latex an alkali hydroxide in an amount not exceeding one tenth per cent of the dry rubber content, adding approximately two tenths per cent of a stabilizing fatty acid, heating under pressure for one hour at approximately 135° C., diluting and coagulating the rubber.

4. The process of deproteinizing rubber latex which comprises adding to the latex an alkali hydroxide in an amount not exceeding one tenth per cent of the dry rubber content, adding approximately two tenths per cent of a stabilizing fatty acid, heating under pressure for one hour at approximately 135° C., adding a creaming agent and creaming.

5. The process of deproteinizing rubber latex which comprises adding to the latex an alkali hydroxide in an amount not exceeding one tenth per cent of the dry rubber content, adding approximately two tenths per cent of a stabilizing fatty acid, heating under pressure for one hour at approximately 135° C., adding a creaming agent, creaming, and mixing with a preservative.

6. The process of deproteinizing rubber latex which comprises adding sodium hydroxide to the latex in the amount of one per cent of the dry rubber content, stirring in approximately two tenths per cent of oleic acid, heating under pressure for one hour at approximately 135° C. and separating the rubber from the serum.

JOHAN HUBERT EGBERT HESSELS.

CERTIFICATE OF CORRECTION.

Patent No. 2,367,120. January 9, 1945.

JOHAN HUBERT EGBERT HESSELS.

It is hereby certified that error appears in the printed specification of the above numbered patent requiring correction as follows: Page 2, second column, line 26, Example I, and line 52, Example II, for the word "millimeters" read --milliliters--; and that the said Letters Patent should be read with this correction therein that the same may conform to the record of the case in the Patent Office.

Signed and sealed this 5th day of March, A. D. 1946.

Leslie Frazer (Seal) First Assistant Commissioner of Patents.